United States Patent

Saada et al.

[11] Patent Number: 5,991,176
[45] Date of Patent: Nov. 23, 1999

[54] METHOD FOR PROCESSING PWM WAVES AND DEVICES THEREFOR

[75] Inventors: Johnny Bou Saada, Brussels; Philippe Colignon, Viesville, both of Belgium

[73] Assignee: GEC Alstrhom Acec Transport S.A., Belgium

[21] Appl. No.: 08/954,864

[22] PCT Filed: Apr. 12, 1996

[86] PCT No.: PCT/BE96/00039

§ 371 Date: Oct. 21, 1997

§ 102(e) Date: Oct. 21, 1997

[87] PCT Pub. No.: WO96/33548

PCT Pub. Date: Oct. 24, 1996

[51] Int. Cl.⁶ .................................................. H02H 7/122
[52] U.S. Cl. ................................................ 363/58; 363/56
[58] Field of Search ................................ 363/56, 57, 58, 363/98, 136, 41, 52, 53

[56] References Cited

U.S. PATENT DOCUMENTS

| | | | |
|---|---|---|---|
| 5,072,354 | 12/1991 | Katto et al. | 363/58 |
| 5,099,408 | 3/1992 | Chen et al. | 363/56 |
| 5,436,819 | 7/1995 | Mikami et al. | 363/98 |
| 5,450,306 | 9/1995 | Garces et al. | 363/98 |
| 5,615,102 | 3/1997 | Daijo | 363/132 |
| 5,621,634 | 4/1997 | Sato | 363/98 |
| 5,646,837 | 7/1997 | Weggel | 363/58 |

FOREIGN PATENT DOCUMENTS

| | | |
|---|---|---|
| 2 693 325 | 7/1992 | France . |
| 0 458 055 A2 | 4/1991 | Germany . |
| 2 238 188 | 5/1991 | United Kingdom . |

OTHER PUBLICATIONS

Mura, Y., et al. PWM strategy for high frequency carrier inverters eliminating current–clamps during switching dead––time. Proceedings of the Industry Applications Society Annual Meetings vol. 1, Oct. 4–9, 1992, Houston, U.S.A., pp. 317–322.

Zargari, N., et al. Input filter design for PWM current–source rectifiers. APEC '93 Mar. 7–11, 1993, San Diego, U.S.A., pp. 824–830.

Primary Examiner—Matthew Nguyen
Attorney, Agent, or Firm—Knobbe, Martens, Olson & Bear, LLP

[57] ABSTRACT

A method for processing PWM waves for a voltage inverter or a voltage-controlled rectifier, including at least one pair of switches, said inverter or rectifier being controlled by a modulator and a discriminator. According to the method, two set waves corrected according to the current direction in the load or the source are applied to the discriminator. The corrected set wave for the output current has a high level to which a delay is added during transition from the high level to the low level, and the corrected set wave for the input current has a low level to which a delay is added during transition from the low level to the high level. The high level is defined by the fact that the switch connected to the most positive load is closed while the switch connected to the most negative load is open, and the low level is defined by the reverse.

10 Claims, 10 Drawing Sheets

METHOD FOR PROCESSING PWM WAVES AND DEVICES THEREFOR

SUBJECT OF THE INVENTION

The present invention relates to a method for processing PWM waves intended for an inverter or a controlled rectifier, and more particularly with a view to obtaining the reduction of harmonics.

The present invention also relates to devices for implementing the method according to the present invention.

PRIOR ART RELEVANT TO THE INVENTION

Inverters, and more particularly voltage inverters, are intended to deliver an AC voltage from a DC voltage, whereas controlled rectifiers are intended to deliver a DC voltage from an AC voltage.

In the following description, reference will more particularly be made to inverters, but exactly the same problems arise for controlled rectifiers.

By way of example, inverters can be used for variable-speed control of synchronous or asynchronous machines.

In this case, it is necessary to supply the load, and more particularly each phase of a synchronous or asynchronous motor, with a three-phase voltage system as close as possible to a balanced sinusoidal three-phase system that can vary in frequency and in amplitude.

Voltage inverters are well-known devices which generally use circuits of power components such as thyristors, GTOs, etc. which switch particularly quickly.

An inverter is controlled by a modulator and a discriminator. The role of the modulator is to create a set wave, whereas the discriminator makes it possible to split this wave into a plurality of waves which are intended for individually controlling the various switches.

The simplest inverters have two levels and are composed of two switches (thyristors, GTOs, etc.) which alternately supply the load. Since this load is of the inductive type, it is necessary for a diode referred to as a "free-wheeling diode" to be placed in parallel with the switch in order to allow the load current to flow when the corresponding switch is open.

A simple square wave is customarily used as the set wave, in order to allow switching of one or other of the switches at each edge of the pulse. This square wave should successively close one or other of the switches and simultaneously open the opposite switch.

For obvious reasons of supply short-circuit, it is essential to check that two switches are never closed at the same time. It is here that the discriminator is involved, having the purpose of introducing a delay on closure of the corresponding switches, so that it is always certain that, when the command to close one switch is given, the opposite switch is already open.

This means that there is always a slight delay, referred to as "dead time" between the instant when one switch is opened and the instant when the opposite switch is closed, these two operations being therefore never simultaneous.

This is the cause of the presence of undesirable harmonics, and more particularly of the 5th and 7th harmonics which appear in the motor currents, this generating the presence of a 6th harmonic on the supply side and the drive torque side.

In reality, it is the 6th harmonic which is the most problematic because, for a motor supplied at $\frac{1}{6}$ of the frequency used for signalling, there will be a risk of interference. By way of example, the motor supplied at $8\frac{1}{3}$ Hz risks causing a perturbation in the signalling system which uses 50 Hz.

Another problem resides in the fact that the various switches cannot switch instantaneously from a zero value (current on, corresponding to closure) to a positive value of the voltage (current off and corresponding to opening) and vice versa. This means that, for a certain time lapse, there is simultaneously a non-zero voltage and non-zero current, and a loss of power is therefore observed each time switching takes place.

In order to solve this problem, in the case when the various components cannot sustain a power loss of this type, it is known to propose a switching-aid cell. An example of a cell of this type may consist simply of a snubber which essentially comprises a capacitor connected in parallel on each switch. The purpose of this snubber is to absorb the power losses by limiting the voltage, and more particularly by limiting its growth, on switching. Another example of a cell which is often used in combination with the snubber is the so-called "di/dt" cell, which essentially comprises an inductor in series with the switches. Because of the presence of these various switching-aid cells, a slower increase in the voltage is observed, which makes it possible to limit the power losses on switching.

The problem of the presence of harmonics is essentially the same for an inverter with or without a switching-aid cell. In particular, the presence of 5th and 7th harmonics on the motor side is also observed in the case of using an inverter with a snubber, as is the presence of the 6th harmonic on the supply side and the drive torque side.

It should be noted that, in the case of controlled rectifiers, exactly the same problems arise, except for the fact that the load should in this case be considered as the source, and the supply as being the load.

OBJECTS OF THE INVENTION

The object of the present invention is to provide a method which makes it possible to reduce, or eliminate, the effect of the dead times in an inverter or a controlled rectifier, and therefore makes it possible to reduce the effect of the undesirable harmonics.

The object of the present invention is, in particular, to provide a method which can be applied to inverters or control rectifiers, with or without a switching-aid cell, irrespective of whether they have two levels or multiple levels.

In particular, the object of the present invention is, in the case of a three-phase inverter supplying a synchronous or asynchronous motor, to provide a method which makes it possible to reduce the undesirable harmonics such as the 5th and 7th harmonics appearing in the motor currents, and thereby the 6th harmonic appearing on the supply side and the drive torque side.

PRINCIPAL CHARACTERISTIC ELEMENTS OF THE INVENTION

The present invention relates to a method for processing PWM waves intended for a voltage inverter or a voltage-controlled rectifier, comprising at least one pair of switches, this inverter or rectifier being controlled by a modulator and a discriminator, characterized in that two set signals, corrected as a function of the direction of the current in the load or in the source, are applied to the discriminator, the set signal corrected for the output current having a high state supplemented by a delay on transition from the high state to the low state, and the set signal corrected for the input current having a low state supplemented by a delay on transition from the low state to the high state, the high state being defined by the fact that the switch connected to the most positive load is closed whereas the switch connected to the most negative load is open, the low state being defined by the reverse.

In the case when the inverter or rectifier does not have a switching-aid cell, the corrected set signals introduce delays which correspond to the dead time created itself by the discriminator.

In the case involving an inverter or rectifier with a switching-aid cell, the delay introduced in the corrected set signals depends not only on the direction of the current but also on its value.

It should be noted that the present method can be applied equally well to inverters or rectifiers with two levels and to multi-level inverters or rectifiers.

The present invention also relates to a device for implementing the method.

BRIEF DESCRIPTION OF THE FIGURES

The present invention will be described in more detail with reference to the following figures.

DESCRIPTION OF SEVERAL PREFERRED EMBODIMENTS OF THE INVENTION

In this section, the description is limited to a two-level inverter. The person skilled in the art will find it easy to generalize this description to a multi-level inverter as well as to a two-level or multi-level rectifier.

Figure 1:
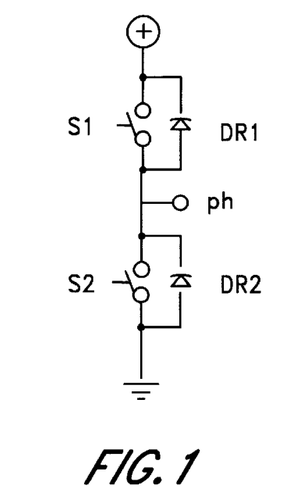
FIG. 1 represents a schematized view of a branch of a conventional two-level inverter.

FIG. 1 schematically represents a branch of a conventional two-level inverter which is used in the context of the present invention. In conventional fashion, this inverter comprises two switches S1 and S2 which alternately supply a load that may, for example, be a phase of an asynchronous motor. In this case, the load is of the inductive type and it is necessary for each of the two switches S1 and S2 to be connected in parallel with a diode, which is referred to as a "free-wheeling diode" DR1 or DR2, which allows the load current to flow when the corresponding switch is open. Indeed, the presence of this diode allows the inductive load current to decrease and thus makes it possible to avoid any destructive overvoltage when the corresponding switch is opened.

The inverter is controlled by a modulator and a discriminator.

Figure 2A:
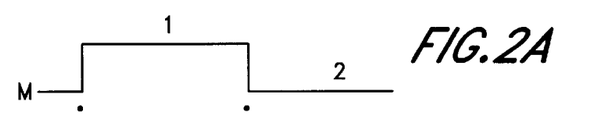
FIGS. 2a–2e represents the set wave (FIG. 2a) created by the modulator for an inverter as described in FIG. 1, as well as the waves which are obtained at the output of the discriminator and are intended for directly controlling the switches (FIGS. 2b and 2c) and the corresponding voltages applied in this case to the motor (FIGS. 2d and 2e).

FIG. 2a represents a set wave M which is in the form of successive pulses. When the high level 1 is reached, this means that the switch S1 is to be closed and the switch S2 is to be open. Conversely, when the low level 2 is reached, the switch S2 is to be closed whereas the switch S1 is to be opened. Consequently, at each leading or trailing edge, it is necessary to switch instantaneously the switch S1 in order to close it and the switch S2 in order to open it, or vice versa.

Of course, a check should be made that the two switches (S1 and S2) are never simultaneously closed, which would short-circuit the supply. In order to avoid this situation, the instant when one switch is closed is delayed for a certain length of time after the set signal has been given. In reality, this task is performed by the discriminator.

Figure 2B:
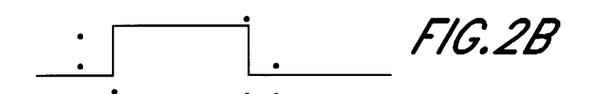
Figure 2C:
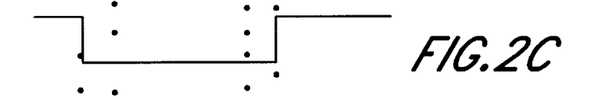

FIGS. 2b and 2c represented the waves which are modified by the discriminator and which will control the two switches S1 and S2. As can be seen, the closure of a switch turning the branch on does not take place instantaneously, but happens with a delay referred to as the "dead time", whereas the opening leading to a break may be considered as instantaneous.

As can be seen in FIGS. 2b and 2c, the two switches are never simultaneously closed. Conversely, in certain cases, the two switches S1 and S2 may be considered as opened simultaneously.

Figure 2D:
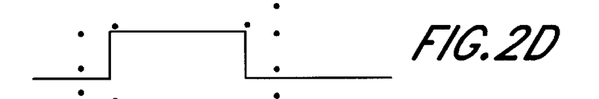
Figure 2E:
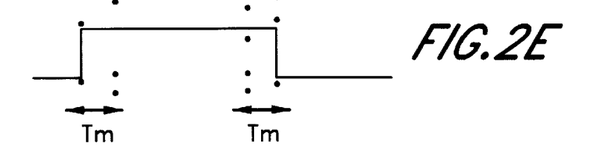

The result of this is that at least one of the two free-wheeling diodes DR1 or DR2 will be on during the dead times, this depending on the direction of the current. Specifically, when the current is an output current, it is the lower diode DR2 which is on during the dead time, thus reducing the high-level time of the output voltage (see curve 2d). In the opposite case, with an input current, it is the upper diode DR1 which is on during the dead time, in this case increasing the high-level time of the output voltage (see curve 2e).

It should, however, be noted that this phenomenon is variable, since it depends on the direction of the current.

With the assumption that the switches respond instantaneously to the set signal M, that is to say with the assumption that there is no dead time between the set signal M and the response of the switches, it is found that 5th and 7th harmonic levels correspond to theory and do not significantly perturb the motor currents.

Nevertheless, because of this presence of a dead time on switching to closure, an increase in the 5th and 7th harmonics is observed in the motor currents, as well as in the 6th harmonic on the supply side and the drive torque side. This harmonic is particularly problematic for the reasons set out above.

The object of the present invention is to provide a solution to this problem by suggesting the use of two corrected control set signals, one for the case when the current is an output current and the other for the case when the current is an input current.

Figure 3:
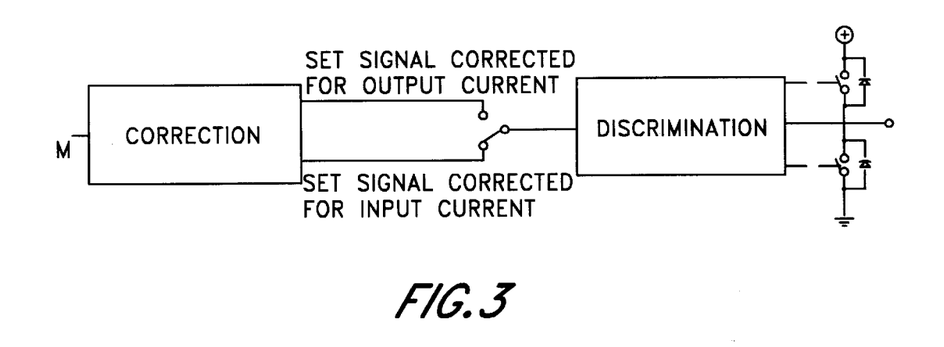
FIG. 3 represents a block diagram of a device for implementing the method according to the invention.

FIG. 3 represents a block diagram of a device for controlling a conventional two-level inverter by using the method according to the present invention. In this case, the discriminator is either controlled by a set signal corrected for an output current, or by a set signal corrected for an input current. It is the direction of the current in the load which will determine whether one or other of the two corrected set signals is used.

Figure 4A:
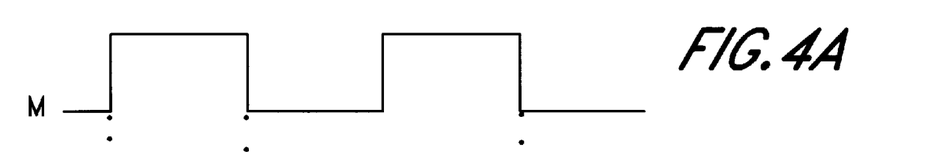
FIGS. 4a–4e represents the corrected waves (FIGS. 4b and 4c) for a given set wave (FIG. 4a) to be applied to a two-level inverter as described in FIG. 1 in order to implement the method according to the present invention as well as the output voltages applied in this case to the motor (FIGS. 4d and 4e).
Figures 4B, 4C:
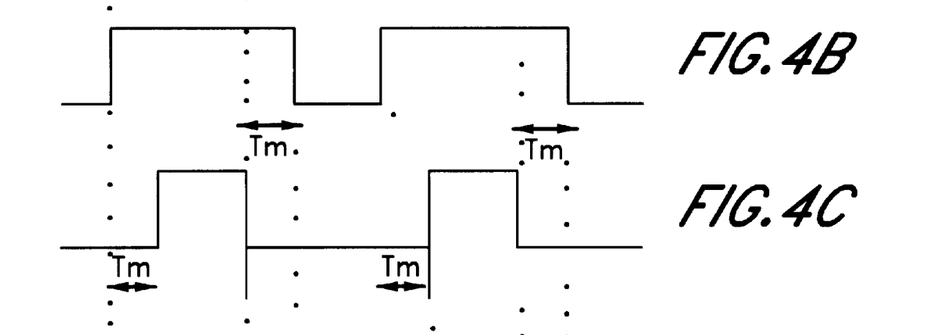

FIG. 4 represents the ideal set wave M (FIG. 4a) and each of the two corrected set signals, on the one hand for the output current (FIG. 4b) and on the other hand for the input current (FIG. 4c). As can be seen in the case of a set signal corrected for an output current, the high level 1 is supplemented by a time $T_m$ which, in the present case, corresponds to the dead time on the trailing edge, that is to say on a transition from the high state 1 to the low state 2. This transition corresponds in reality to the opening of the switch 1 and to the closure of the switch 2. The set signal corrected for the input current has a high level 1 decreased by a time $T_m$ which also corresponds to the dead time at each leading edge, that is to say on transition from the low state 2 to the high state 1.

Figure 4D:
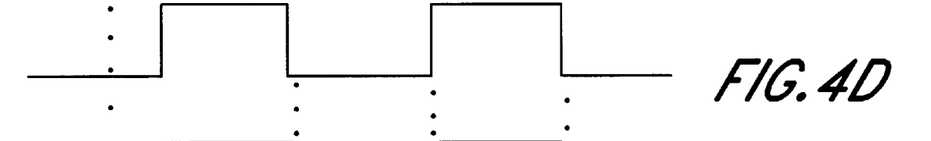
Figure 4E:
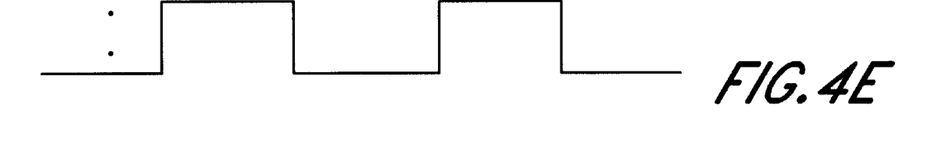

Furthermore, FIGS. 4d and 4e represent the output voltages in the case when corrected set signals are used, either for an input current or an output current. It is observed that the correction allows the output voltage of the inverter to be made identical in both cases, and identical to what it would be without a dead time, to within a delay $T_m$.

Figure 5:
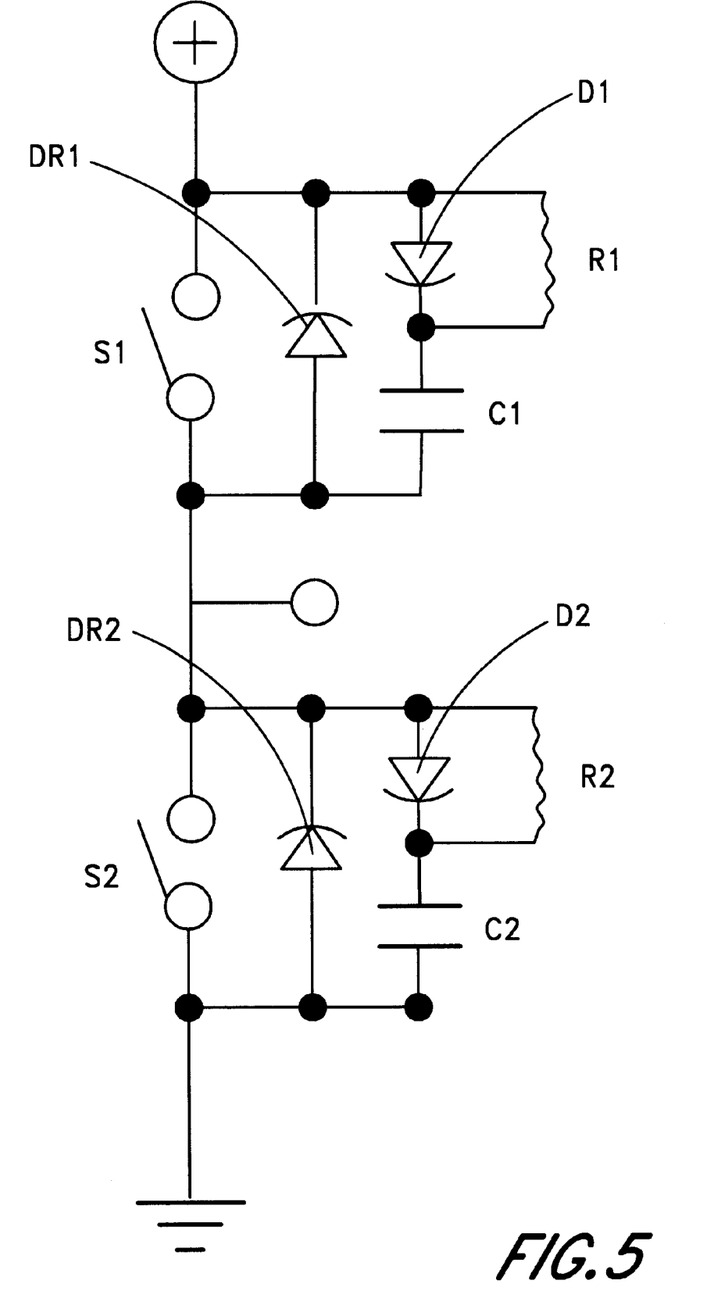
FIG. 5 represents a schematized view of a branch of a conventional two-level inverter with a snubber.

FIG. 5 represents a schematized view of a branch of a conventional two-level inverter with a snubber.

This snubber is in reality a switching-aid cell, which makes it possible to absorb the power losses which occur each time the switches S1 and S2 are switched, by limiting the voltage, and more particularly by limiting its increase.

As represented in FIG. 5, this cell comprises a capacity C1 (or C2) connected in parallel on each switch, this capacitor being itself in series with a resistor R1 (or R2) as well as a second diode D1 (or D2) which is in the opposite direction to the free-wheeling diode DR1 (or DR2).

When a switch S1 (or S2) is opened, this makes it possible to divert the current to the corresponding capacitor C1 (or C2), which was initially uncharged.

When the switch S1 (or S2) is closed, the corresponding capacitor C1 (or C2) discharges through it. In this case, the discharge current will be limited by the presence of the resistor R1 (or R2) in series with the capacitor C1 (or C2), thus forming an RC circuit.

In general, each time switching takes place, it is observed that one of the two capacitors will charge whereas the other starts to discharge through its associated resistor.

A slower increase in the voltage is then observed, thus limiting the power loss from switching.

Figure 6A:
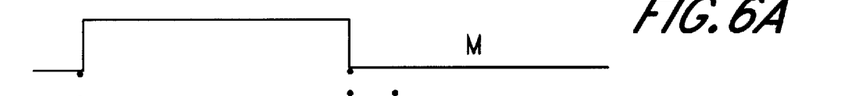
FIGS. 6a–6g represents the set wave (FIG. 6a) created by the modulator and intended to control an inverter as described in FIG. 5, as well as the output voltages applied in this case to the motor for a low or high input current (FIGS. 6b and 6c) and for a low or high output current (FIGS. 6d and 6e), FIGS. 6f and 6g representing details of FIGS. 6b and 6c.
Figure 6B:
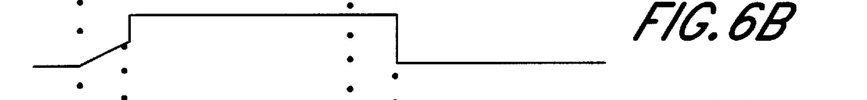
Figure 6C:
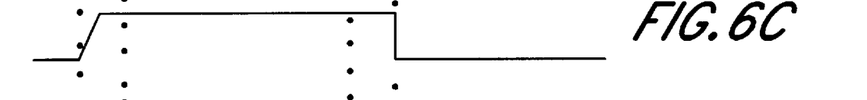
Figure 6D:
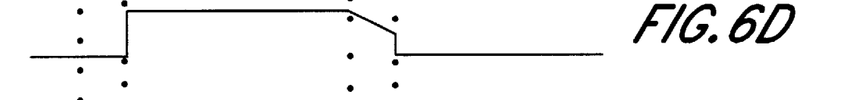
Figure 6E:
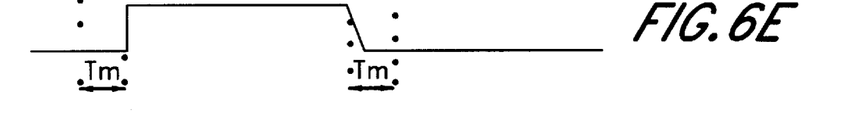

FIG. 6 represents the set wave M (FIG. 6a) as well as the corresponding voltages applied to the motor in the case of a low input current (FIG. 6b), in the case of a high input current (FIG. 6c), in the case of a low output current (FIG. 6d) and in the case of a high output current (FIG. 6e).

Figure 6F:
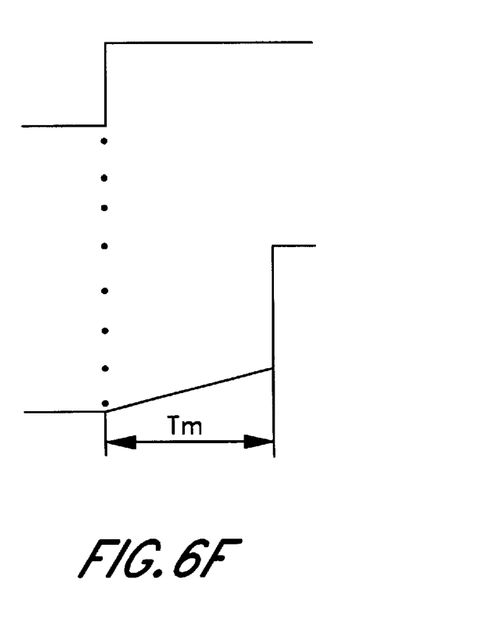
Figure 6G:
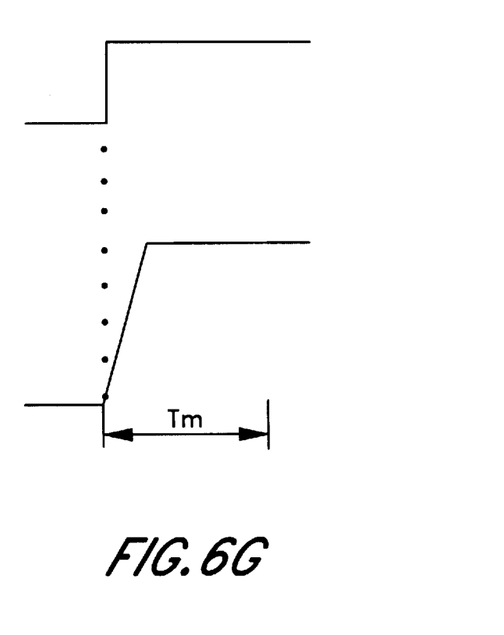

Let us analyse in more depth the case of an input current on a low/high transition of the set signal M, that is to say in the case when the switch S1 is to close whereas the switch S2 is to open (FIGS. 6f and 6g).

In this figurative case, it is found that the initially zero output voltage cannot increase instantaneously. This is because it is first necessary to charge the capacitor C2 of the lower snubber using the current.

If the current is high, the voltage rises quickly and the output voltage rapidly reaches the supply voltage. In this case, the upper free-wheeling diode DR1 conducts and allows the current to flow to the supply (FIG. 6g).

In the case when the current is low, the output voltage applied to the motor remains less than the supply voltage at the end of the dead time. At this moment, the switching of the upper switch S1 takes place and the capacitor C2 of the lower snubber is charged suddenly (FIG. 6f).

This means that a deformation is observed in the voltages supplied to the motor, this depending both on the direction of the current and also on its value.

For this reason, a corrected set signal should be proposed which depends not only on the direction of the current but also on its strength, in the case of controlling an inverter with a switching-aid cell.

In particular, the corrected set signal should, depending on whether an output or an input current is involved, have a level 1 supplemented or reduced by a time corresponding to a time referred to as the "effective time", which takes into account the value of the current.

In practice, for a certain current $I_T$, the charging time of the snubber is equivalent to the dead time, namely $$I_T = \frac{C \times U_0}{T_{dead}}$$

For $I > I_T$, the effect of the dead time is equivalent to a delay $T_{eff}$:

$$T_{eff} = T_{dead}\left(1 - \frac{I_T}{2|I|}\right)$$

For $I < I_T$, the effect of the dead time is equivalent to a delay $T_{eff}$:

$$T_{eff} = T_{dead}\frac{|I|}{2I_T}$$

In this way, compensation is thus made for the actual effect of a dead time on switching to closure, and the level of the 6th harmonic on the supply side is reduced.

It should be noted that, in certain cases, and more particularly in the case when a current is low, and irrespective of the direction of this current, it may be envisaged not to use corrected set signals. This is because, in the case of low currents, the influence of these corrections is relatively limited.

Figure 7A:
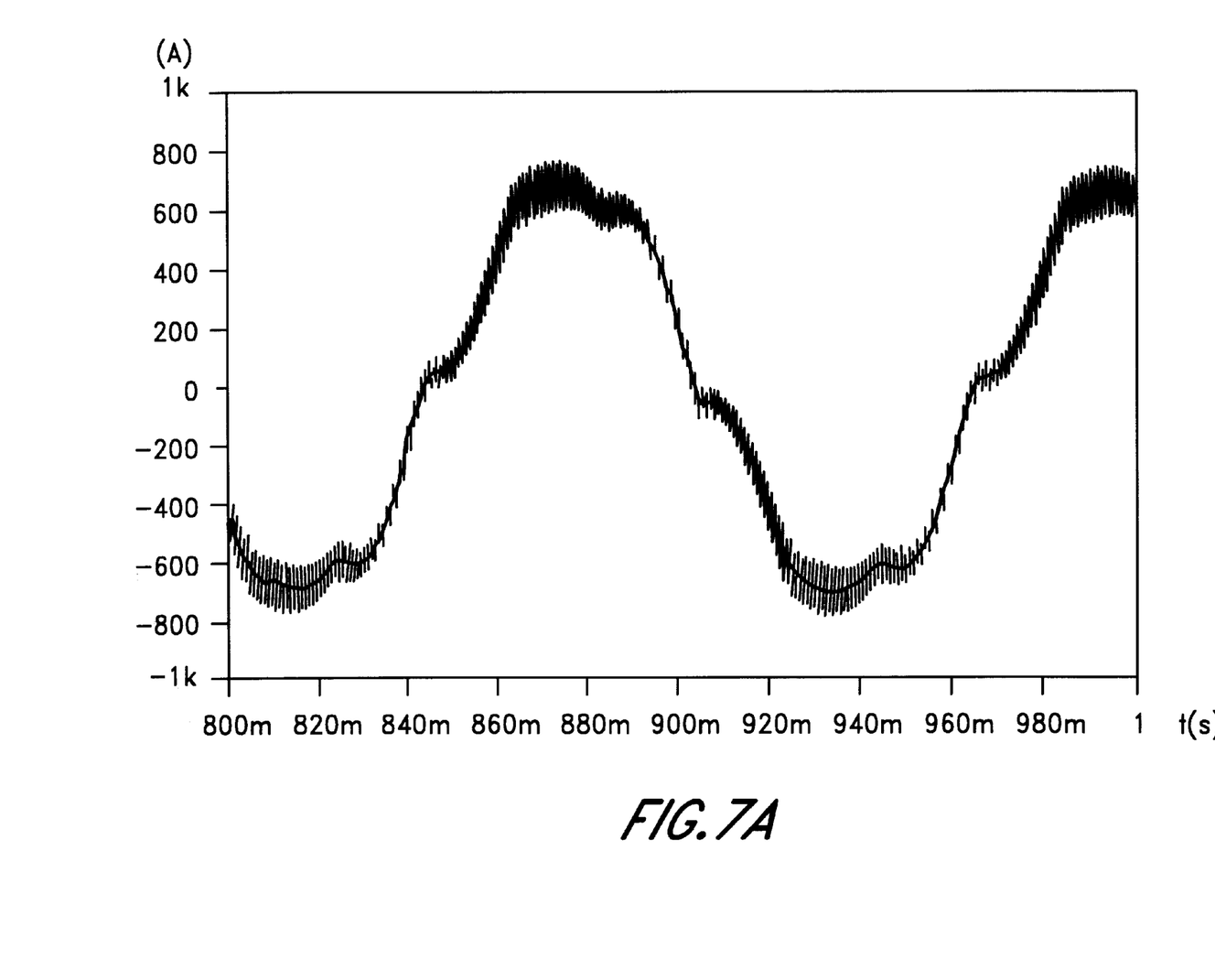
FIGS. 7a–7b represents the general shape of the motor current, on the one hand when not applying the method according to the present invention (FIG. 7a), and on the other hand, applying this method (FIG. 7b).
Figure 7B:
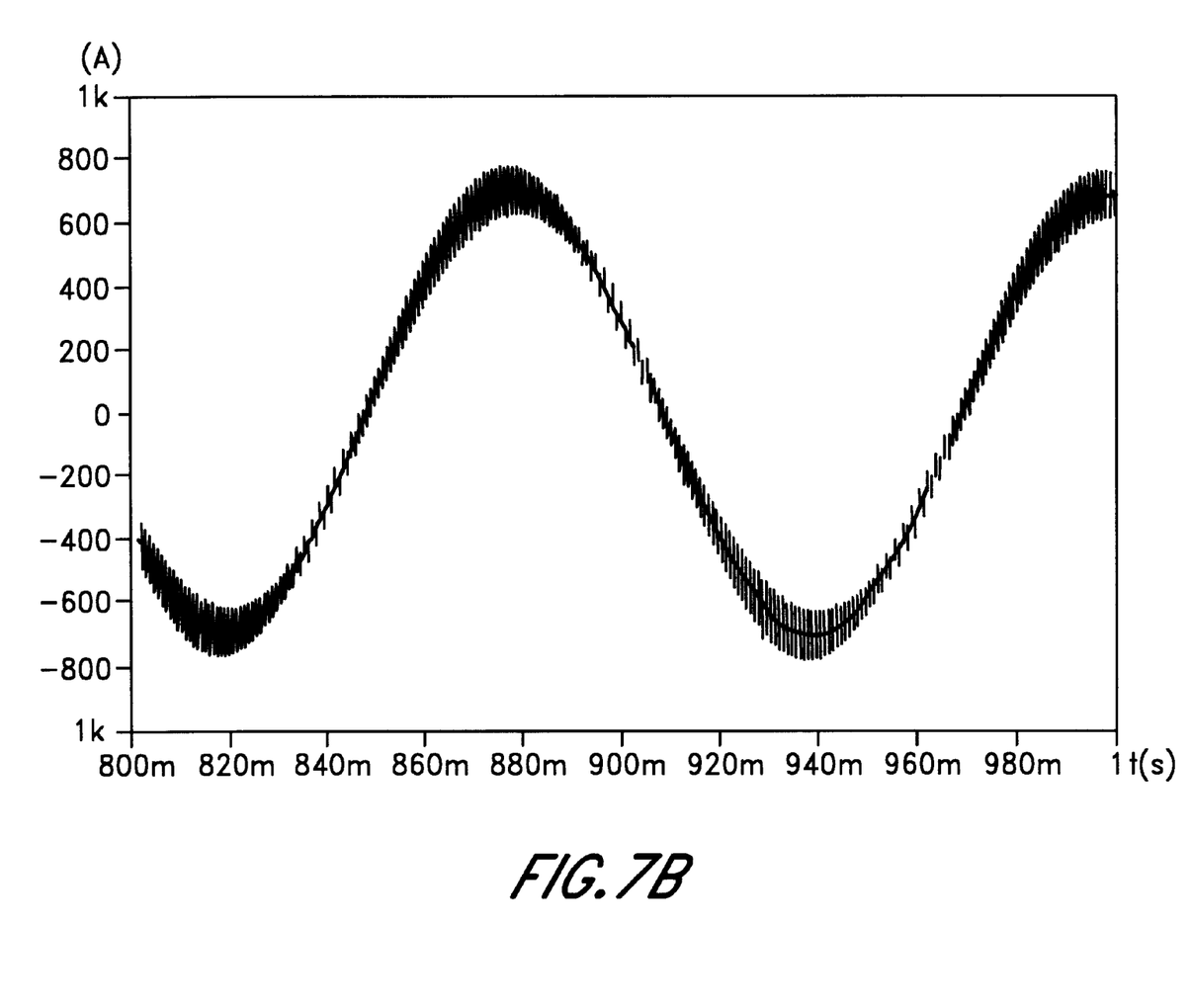

Furthermore, FIGS. 7 represent the general appearance of the motor currents, either in the case when the method according to the present invention is not applied (FIG. 7a), or in the case when this method is applied (FIG. 7b), for an inverter without a snubber.

Elimination is observed of the distortion due to the presence of a dead time which exists in the case when corrected set signals are not used, by applying the method according to the present invention.

Figure 8A:
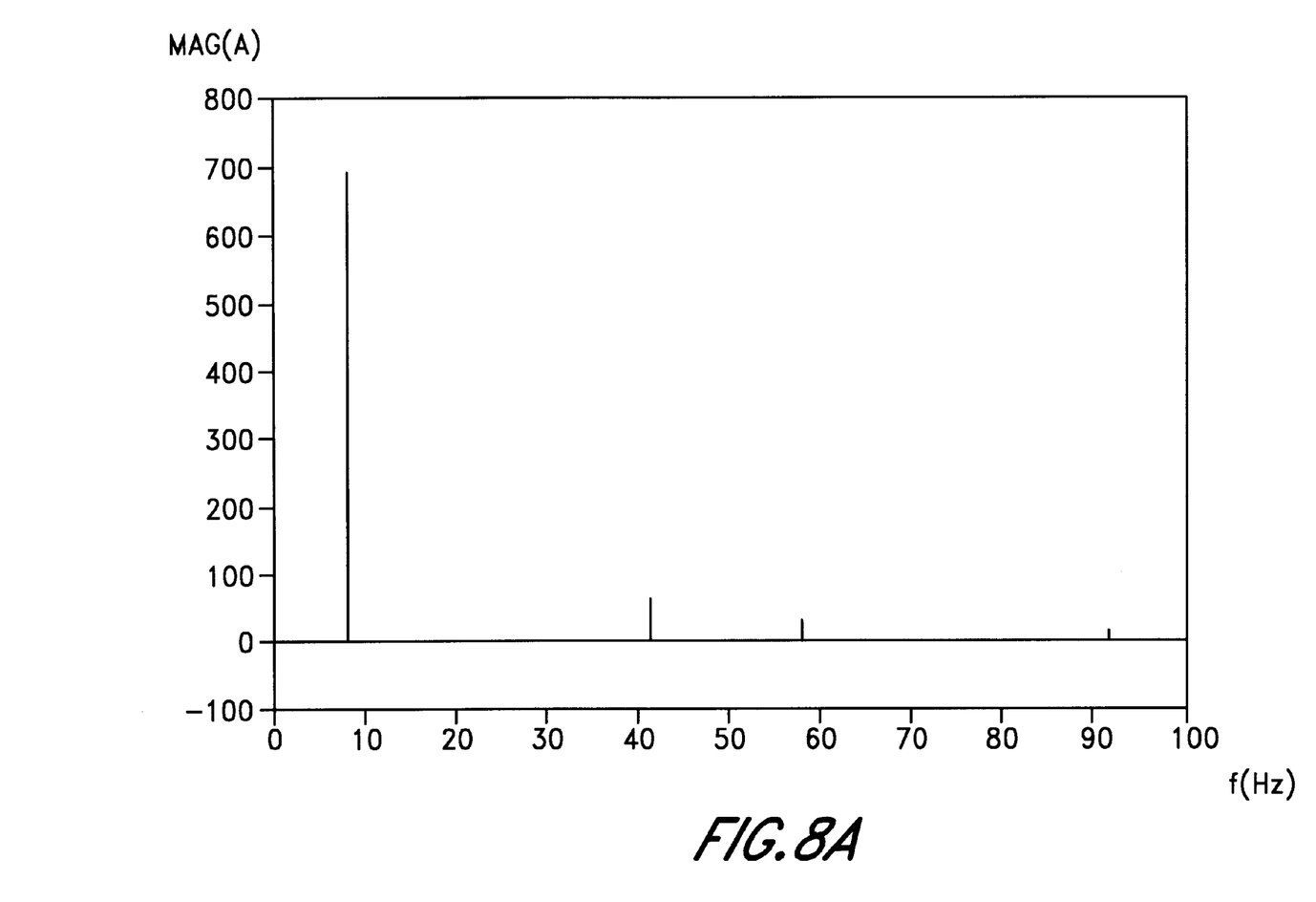
FIGS. 8a–8d represents the harmonics, and more particularly the 5th and 7th harmonics on the motor side, as well as the 6th harmonic on the supply side, on the one hand when the method according to the present invention is not applied (FIGS. 8a and 8b) and, on the other hand, when this method is applied (FIGS. 8c and 8d).
Figure 8B:
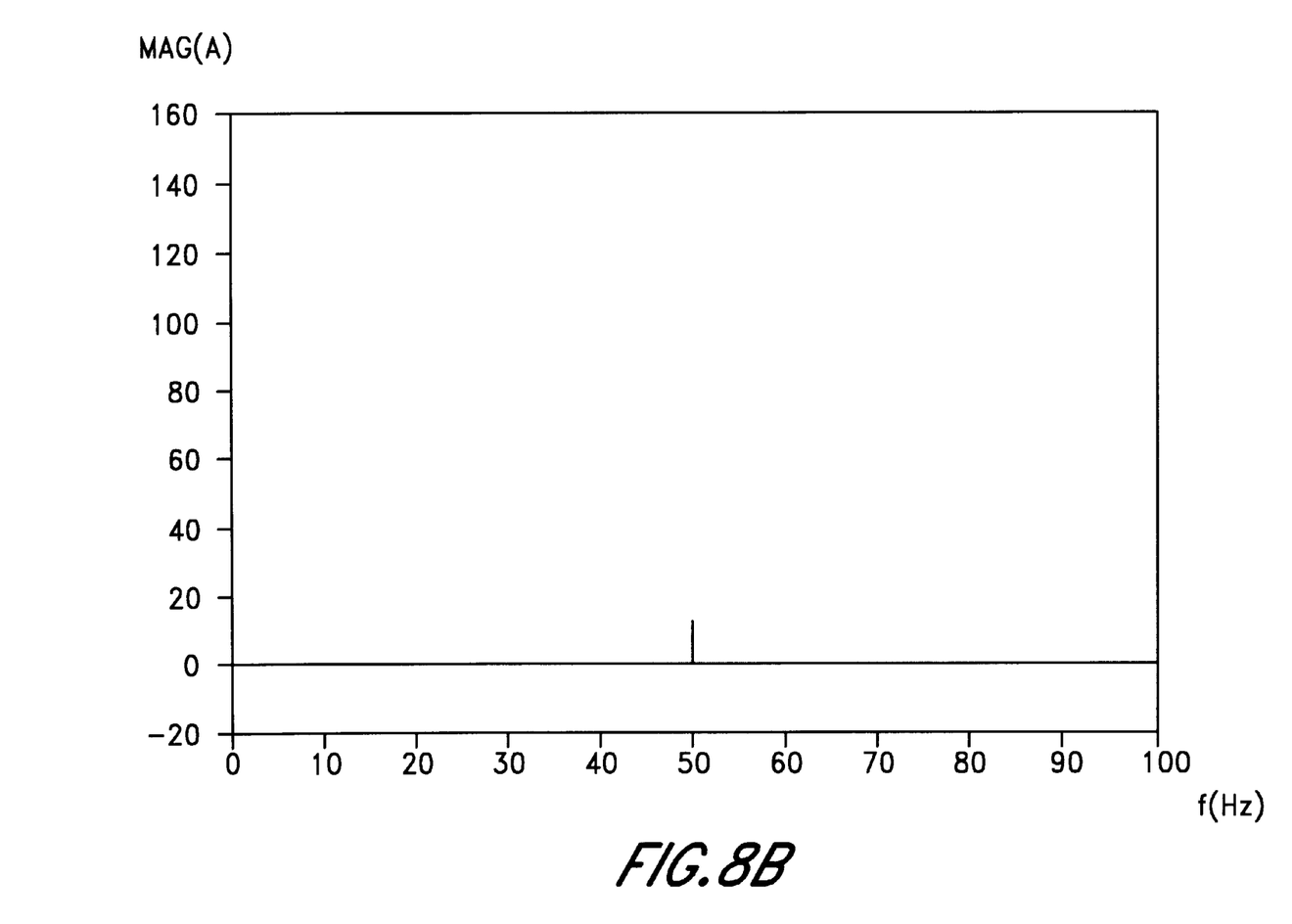
Figure 8C:
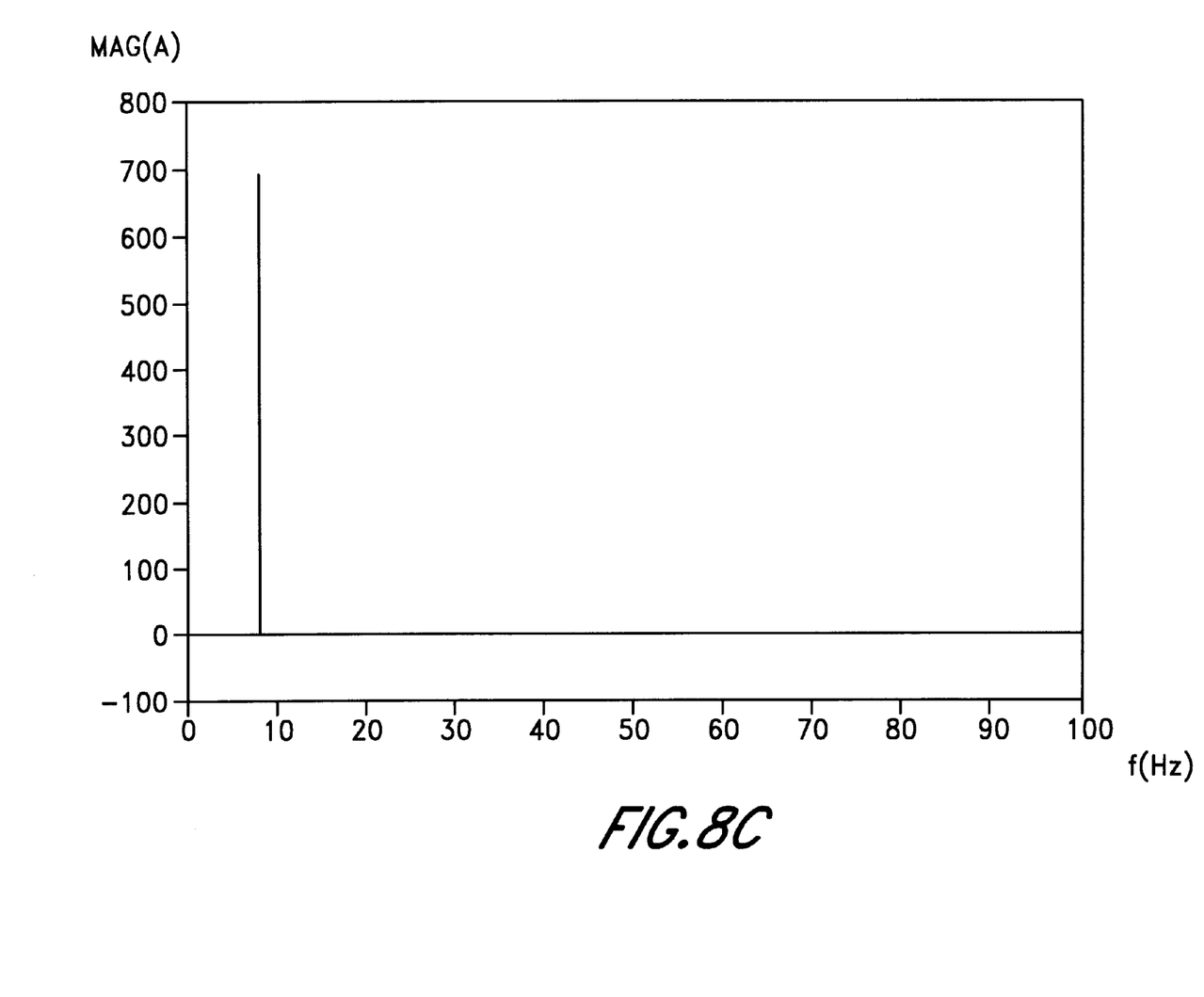
Figure 8D:
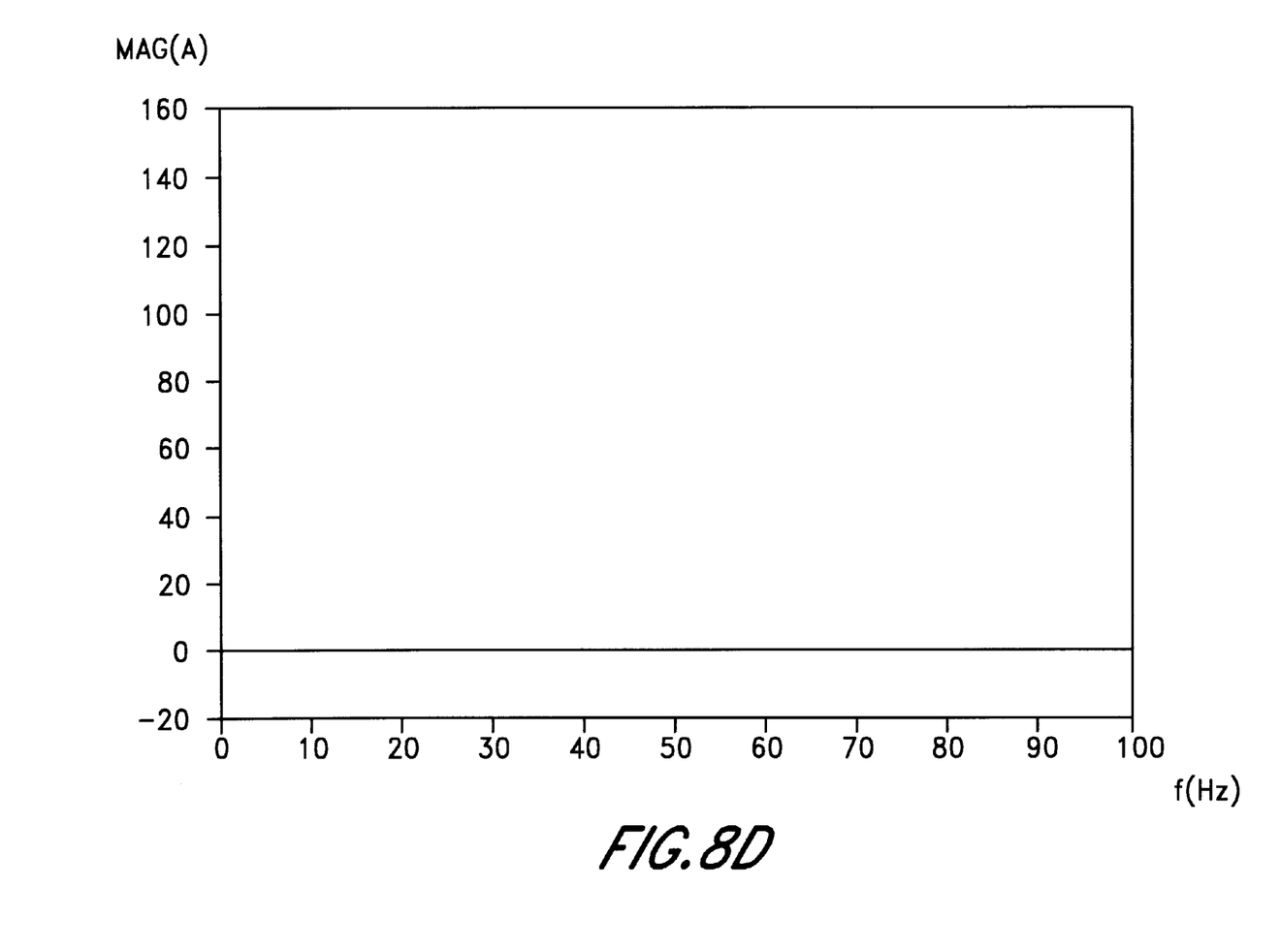

FIGS. 8 represent the 5th and 7th harmonics on the current side, as well as the 6th harmonic on the supply side, on the one hand in the case when the method according to the invention is not applied (see FIG. 8a and 8b), and on the other hand in the case when this method is applied (FIG. 8c and 8d).

It is again observed that the 5th and 7th harmonics in the motor, which are due to the presence of a dead time when switching takes place, have been greatly reduced, whereas the 6th harmonic seen on the supply side is brought to negligible values.

Exactly the same performance can be obtained for an inverter with a snubber.

We claim:

1. Method for processing PWM waves intended for a voltage inverter or a voltage-controlled rectifier, comprising at least one pair of switches connected in series, this inverter or rectifier being controlled by at least one set wave having a succession of high states and low states, which is obtained with the aid of a modulator, the high state being defined by the fact that the switch connected to the most positive voltage is closed whereas the switch connected to the most negative voltage is open, and the low state being defined by the reverse characterized in that, with the aid of a discriminator, two set signals corrected as a function of the direction of the current leaving or entering the branch are applied, the set signal corrected for the output current having a high state supplemented by a delay on transition from the high state to the low state, and the set signal corrected for the input current having a low state supplemented by a delay on transition from the low state to the high state.

2. Method according to claim 1, characterized in that the delays introduced into the corrected set signals corresponds essentially to dead time introduced by the discriminator during the operation of closing the switches, this being in the case when an inverter or a rectifier is used without a switching-aid cell.

3. Method according to claim 1, characterized in that the delays introduced into the corrected set signals is dependent on the direction of the current and on its value, this being in the case when an inverter or a rectifier is used with a switching-aid cell.

4. Method for processing PWM waves intended for a voltage inverter or a voltage-controlled rectifier, comprising at least one branch with at least one pair of switches connected in series, this inverter or rectifier being controlled by generating at least one wave having a succession of high states and low states, which is obtained with the aid of a modulator, the high state being defined by the fact that the switch connected to the most positive voltage is closed whereas the switch connected to the most negative voltage is open, and the low state being defined by the reverse said set signals; and generating two set signals from said wave, corrected as a function of the direction of the current leaving or entering the branch are applied, the set signals corrected for the output current having a high state supplemented by a delay on transition from the high state to the low state, and the set signals corrected for the input current having a low state supplemented by a delay on transition from the low state to the high state.

5. Method according to claim 4, wherein the delays introduced into the corrected set signals corresponds essentially to dead time introduced by the discriminator during the operation of closing the switches, this being in the case when an inverter or a rectifier is used without a switching-aid cell.

6. Method according to claim 4, wherein the delays introduced into the corrected set signals is dependent on the direction of the current and on its value, this being the case when an inverter or a rectifier is used with a switching-aid cell.

7. Method according to any one of claims 4–6, characterized in that a modulator, on the basis of a set wave, creates two set signals with are corrected as a function of the output current and the input current and will be applied to the discriminator.

8. Use of the method according to any one of claims 4–6 for an inverter or a voltage-controlled rectifier with or without a switching-aid cell, having two levels or having multiple levels.

9. A device for implementing the method for processing PWM waves according to any one of the preceding claims, the waves being intended for controlling a voltage inverter or a voltage-controlled rectifier, this inverter or rectifier comprising at least one branch with at least one pair of switches connected in series, this device comprising:

a modulator creating the PWM control wave in the form of a succession of high states and low states, the high state being defined by the fact that the switch connected to the most positive voltage is closed whereas the switch connected to the most negative voltage is open, an the low state being defined by the reverse; and correcting means for correcting the PWM control wave as a function of the direction of the current leaving or entering the branch, so as to create two set signals, a corrected set signal for the output current having a high state supplemented by a delay on transition from the high state to the low state, and a corrected set signal for the input current having a low state supplemented by a delay on transition from the low state to the high state.

10. A method for processing PWM waves intended for a voltage inverter or a voltage-controlled rectifier having at least one pair of switches connected in series, the inverter or rectifier being controlled by at least one set wave having a succession of high states and low states which are obtained with the aid of a modulator, the high state being defined by the switch connected to the most positive voltage being closed and the switch connected to the most negative voltage being open and the low state being defined by the switch connected to the most positive voltage being open and the switch connected to the most negative voltage being closed, the method comprising:

generating a set wave;

generating two set signals from said set wave, said set signals corrected as a function of the direction of the current leaving or entering the branch, one of said set signal corrected for the output current having a high state supplemented by a delay on transition from the high state to the low state and the other of said set signals corrected for the input current having a low state supplemented by a delay on transition from the low state to the high state.

* * * * *